(12) United States Patent
Billock et al.

(10) Patent No.: US 7,599,913 B2
(45) Date of Patent: Oct. 6, 2009

(54) TIME SERIES MONITORING SYSTEM

(75) Inventors: Joseph Greg Billock, Altadena, CA (US); Ian Douglas Swett, Pasadena, CA (US); Eric Theodore Bax, Altadena, CA (US)

(73) Assignee: Avaya, Inc., Basking Ridge, NJ (US)

( * ) Notice: Subject to any disclaimer, the term of this patent is extended or adjusted under 35 U.S.C. 154(b) by 523 days.

(21) Appl. No.: 10/775,744

(22) Filed: Feb. 9, 2004

(65) Prior Publication Data

US 2004/0220921 A1 Nov. 4, 2004

Related U.S. Application Data

(60) Provisional application No. 60/451,490, filed on Mar. 4, 2003.

(51) Int. Cl.
*G06F 17/30* (2006.01)
(52) U.S. Cl. ............................... 707/3; 707/5; 707/101; 707/104.1
(58) Field of Classification Search ................. 345/440; 702/189; 705/1; 707/100, 1–5, 7, 101
See application file for complete search history.

(56) References Cited

U.S. PATENT DOCUMENTS

| 5,412,769 | A | * | 5/1995 | Maruoka et al. | ............ 345/440 |
| 5,462,438 | A | * | 10/1995 | Becker et al. | ............... 434/430 |
| 5,485,395 | A | * | 1/1996 | Smith | ........................... 702/77 |
| 5,519,861 | A | * | 5/1996 | Ryu et al. | ...................... 707/1 |
| 5,892,520 | A | * | 4/1999 | Ioka et al. | ............ 707/E17.028 |
| 6,279,021 | B1 | * | 8/2001 | Takano et al. | ............... 708/319 |
| 6,505,190 | B1 | * | 1/2003 | Harel et al. | ..................... 707/2 |
| 6,654,485 | B1 | * | 11/2003 | Mitra et al. | .................. 382/131 |
| 2004/0038671 | A1 | * | 2/2004 | Trayford et al. | .......... 455/414.3 |

* cited by examiner

*Primary Examiner*—Charles Rones
*Assistant Examiner*—Rezwanul Mahmood
(74) *Attorney, Agent, or Firm*—Douglas Grover (57) ABSTRACT

A time series monitoring system, implemented in software, executes persistent queries on multiple input time series, handling high data throughput with low response time. The system supports dynamic management of time series, of windows in time series, and of persistent queries. Also, the system can use historical values in present windows to help populate inserted windows.

9 Claims, 7 Drawing Sheets

TIME SERIES MONITORING SYSTEM

CROSS REFERENCE TO RELATED APPLICATIONS

This invention claims the benefit of Provisional Application 60/451,490 filed Mar. 4, 2003.

STATEMENT REGARDING FEDERALLY SPONSORED RESEARCH OR DEVELOPMENT

Not Applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

A time series is a sequence of data indicating values over time. One example is the sequence of daily high temperatures in a city. Another example is the sequence of prices paid for a commodity over time.

One tool for examining time series is a window, which is a subsequence. A time window includes the values associated with a time period. A value window includes a specified number of values. The subsequence specified by a moving window changes over time for a moving time window and changes as values are received for a moving value window. For example, a five-minute moving window includes the values for the past five minutes.

Statistics over windows are useful to monitor time series. For example, the five-minute moving average of a time series is the average of values in the five-minute moving window. Since the values in moving windows change over time, window statistics also change over time. The straightforward method to re-compute a window statistic is to access all values in the window and compute the statistic directly. Online computation is another method. In online computation, a statistic value is computed by modifying the previous value of the statistic to account for values that expired from the window and values added to the window since the previous computation. For example, consider re-computing the sum of a hundred-value moving tick window when a new value is received. The straightforward method is to take the sum of the new value and the ninety-nine most recent previous values. The online method is to take the previous sum, subtract the oldest value used in the previous sum, and add the new value. The straightforward method requires about a hundred mathematical operations; the online method requires two.

When a moving window is inserted on a time series, there can be a time delay before the window becomes valid. For example, consider adding a five-value moving window to a time series. If the window statistics computation only uses values received after the window is formed, then the statistics are not valid until five new values are received. On the other hand, if historical values are available, then they can be used to compute the statistics. As a result, the window becomes valid earlier. For example, if there are values for a two-value moving window and a five-value moving window is inserted, then it is possible to have valid statistics after three new values.

One tool to monitor a set of time series is a persistent query. The persistent query contains an event condition and a payload specification. A system that executes a persistent query sends the specified payload as output if the event condition holds. The event condition may involve statistics over windows. For example, a persistent query could include the event condition:

five-day moving average temperature in Anaheim is more than 20 degrees higher than the ten-day moving average temperature in St. Louis and the payload specification:

latest price for a flight from St. Louis to Anaheim.

There are many uses for a system to monitor time series data. In financial market trading, it is useful to monitor prices of multiple commodities or of the same commodity on different exchanges in order to trade when conditions indicate likely profit. In financial market-making, it is useful to monitor prices and volume in order to adjust bid-ask spreads in response to changes in volatility. For an electrical power provider, it is useful to monitor power usage and availability over time at different locales in order to produce and route power efficiently. Some desirable features of a time series monitoring system include the following.

Support high data throughput with low response time.

Support multiple input time series.

Execute persistent queries.

Support dynamic management of persistent queries, i.e., support insert and delete of persistent queries without halting input and persistent query execution.

Support dynamic management of windows.

Perform online computation of statistics.

Use historical values in present windows to help populate inserted windows.

Previous technologies have some of these features, but none has all. One previous technology with some of these features is a database. Another is online statistics software. Yet another is a system that combines online statistics software with a database.

A database can be configured to support multiple time series, execute persistent queries, and support dynamic management of persistent queries and windows, as follows. For each time series, use a database table to store each value in a record that also has a timestamp field which indicates when the value is received. For each persistent query, form a database trigger that executes a database query. The query encodes the condition and payload specification. Use database-supplied functions to compute statistics in the condition. For example, to compute the five-minute moving average of a time series, apply the database-supplied average function to the values with timestamps indicating receipt within the past five minutes. A shortcoming of using the database in this way is that the database-supplied functions do not perform online computation of statistics. Hence, response time suffers.

There is software that performs online computation of statistics. Some of this software supports high data throughput with low response time and executes persistent queries. However, this software is special-purpose; it does not support dynamic management of persistent queries, support dynamic management of windows, and use historical values in present windows to help populate inserted windows.

It is possible to build a system by combining online statistics software with a database. The statistics software receives time series values, computes statistics, and sends the statistics to the database. The database executes persistent queries. The system does not support dynamic management of persistent queries, support dynamic management of windows, and use historical values in present windows to help populate inserted windows. Even though the database alone supports these features, the system as a whole does not. The statistics software lacks these features, and both the database and the statistics software would need these features for the system as a whole to have them.

SUMMARY OF THE INVENTION

The present invention, a system to monitor time series, successfully combines some of the flexibility of a database with the speed of online statistics computation. The system executes persistent queries on multiple input time series, successfully handling high data throughput with low response time. The system supports dynamic management of time series, of windows in time series, and of persistent queries. Also, the system can use historical values in present windows to help populate inserted windows.

DETAILED DESCRIPTION OF PREFERRED EMBODIMENTS

Figure 1:
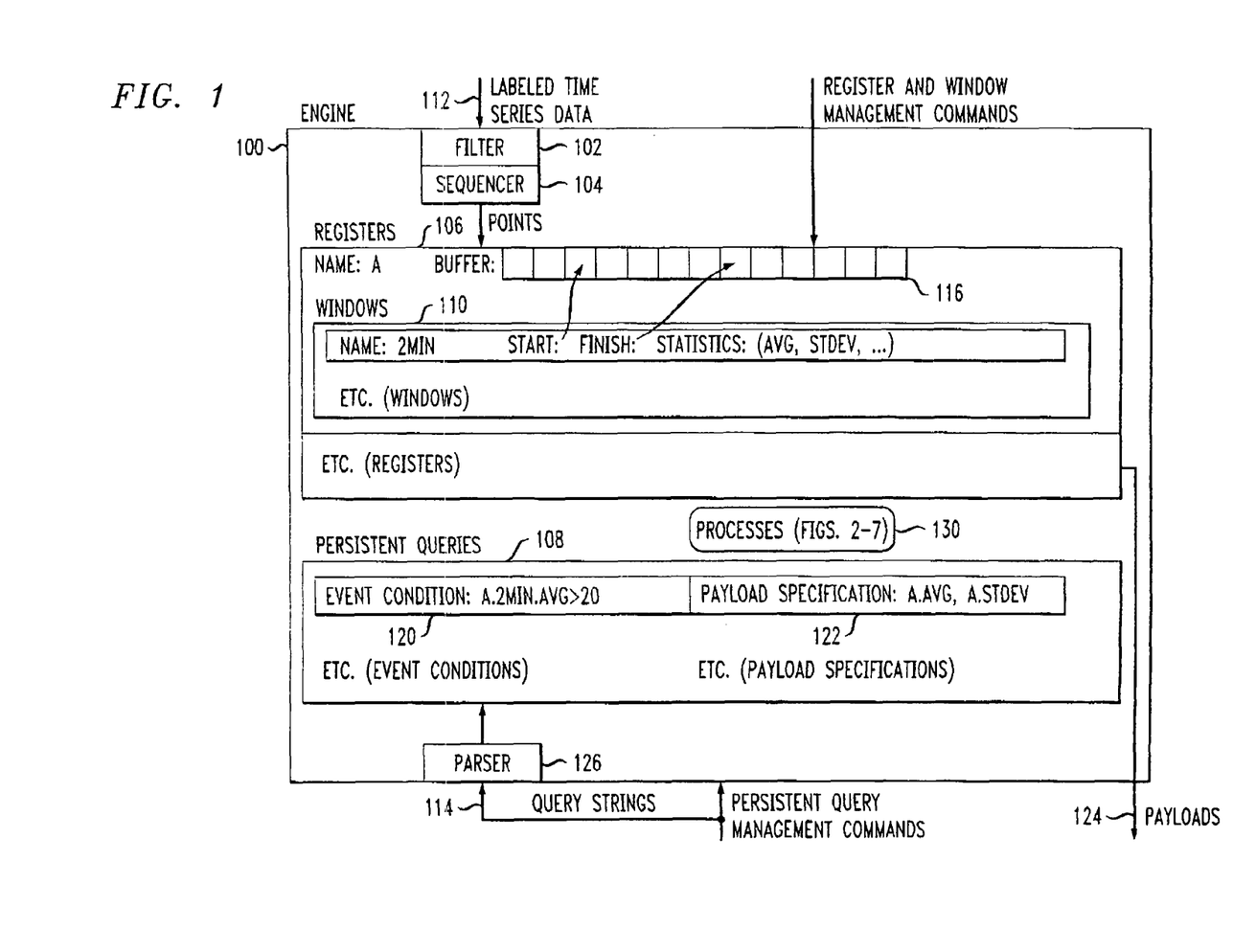
FIG. 1 is a diagram of the time series monitoring system.

The embodiment described here is a time series monitoring system implemented as software in the Java computer language. Refer to FIG. 1 for a diagram showing system parts and some of their relationships. This description begins with an introduction to system parts and their roles. Next, there is a description of how the system responds to an input value from a time series. Next, there is a description of persistent query syntax and parsing. Then processes used by the system to accomplish various functions are described in a step-by-step fashion.

Parts

The time series monitoring system can be implemented using a software class called an engine. The engine 100 comprises a filter 102, a sequencer 104, a set of registers 106, and a set of persistent queries 108. The engine 100 also coordinates methods to insert data 112 into the system, execute persistent queries 114 and to dynamically manage registers 106, windows 110, and persistent queries 108.

Each time series monitored by the system corresponds to a register 106. Each register 106 has a ring buffer 116 to store time series values. Each register 106 may contain one or more windows 110. Each window 110 is associated with a subset of the time series. Each window 110 maintains statistics for the associated subset of the time series.

Each persistent query 108 comprises an event condition 120 and a payload specification 122. The event condition 120 is a Boolean function that may depend on statistics from multiple registers 106. The payload specification 122 expresses which data are to be output by the engine 100 when the event condition 120 is evaluated as true. For each persistent query 108 there is a set of associated registers 106 called trigger registers. The engine 100 evaluates the event condition 108 in response to receiving a value from any time series corresponding to a trigger register 106.

Response to an Input from a Time Series

The engine 100 receives as input a stream of labeled data 112, in which each value is associated with a label indicating the time series to which the value belongs. For each input value, the filter 102 uses the label to determine whether the value belongs to a time series monitored by the system. If not, then the value is discarded. If so, then the engine 100 forms a point that comprises the value, a timestamp, and a unique id number supplied by a sequencer 104. Then the engine 100 sends the point to the register 106 that corresponds to the time series to which the value belongs.

The register 106 installs the point in the buffer 116 of the register 106. Next, each window 110 in the register 106 updates the statistics for the window 110 using online computation, accounting for the new point and for any points that have expired from the window 110 since the previous statistics computation. Then the register 106 adjusts the buffer 116, discarding points that have expired from all windows 110, growing the buffer 116 if needed to accommodate new points, and shrinking the buffer 116 if needed to accommodate storage needs of other buffers 116.

Then the engine 100 executes each persistent query 108 for which the register 106 is a trigger. Each persistent query 108 comprises an event condition 120 and a payload specification 122. The engine 100 evaluates the event condition 120. If the event condition 108 is true, then the engine 100 creates a payload 124 according to the payload specification 122 and delivers the payload 124 as output.

Persistent Query Syntax and Parsing

A persistent query 108 may be expressed using a query string 114. The query string syntax is similar to SQL, the standard database query language. The format for a query string 114 is as follows.

SELECT <columns> FROM <trigger registers> WHERE <condition>

Columns

The columns encode the payload specification 122. Column syntax is as follows.

<columns>=REGISTER.WINDOW.NAME [[, REGISTER.WINDOW.NAME [, . . . ]]

This is a comma-separated list of identifiers of the form REGISTER.WINDOW.NAME where NAME is the name of a statistic (like COUNT, SUM, MEAN, STDEV), one of (VALID, ALL, LAST, VAL), or a number. VALID is true when the window 110 is valid (has enough points in it or enough time in it) and false if not. ALL indicates the set of points that entered the window 110 since the last time the event condition 108 evaluated as true. If the window 110 has received a new point since the event condition 120 last evaluated to true, the LAST indicates the newest point in the window 110, and VAL is the time series value in that point. Otherwise, LAST and CAL are both null. (The behavior for VALID AND VAL is slightly different in evaluation of event conditions 120. The differences are explained later, in the "Condition" subsection.) A number indicates the point at the position in the window 110 specified by the number, with the number 0 indicating the oldest point. For example, "WINDOW.0, WINDOW.1, WINDOW.2" indicates the oldest three points in WINDOW.

The payload 124 is delivered as a pair of lists. One list contains the column names specified in the query string 114. The other list contains the corresponding values.

Tripper Registers

The persistent query execution system evaluates the event condition 120 each time a point is added to any register 106 in the set of trigger registers 106 for the persistent query 108. The trigger registers syntax is as follows.

<trigger registers.=reg1 [[, reg2 [, ... ]]

This is a comma-separated list of registers 106.

Condition

The event condition 120 is encoded in the section of the query denoted by

<condition>

The syntax is that of a Java expression, extended to allow use of identifiers in the same REGISTER.WINDOW.NAME syntax as in the payload specification 122. Allowed names include statistics, VALID, and VAL. All such identifiers resolve to primitive double type values. In the expression, VALID is 1.0 if the window 110 is valid and 0.0 otherwise. The name VAL refers to the value in the last point added to the window 110.

Example

For example, consider the following query string 114.

SELECT ABC.50MEAN, DEF.5MIN.VAL, DEF.1MIN.ALL, DEF.50.STDEV FROM ABC, DEF WHERE ABC.50.MEAN>DEF.50.MEAN+DEF.50.STDEV

After adding the corresponding query 108 to an engine 100, the following occurs. After each new point is inserted into register ABC or DEF, the condition ABC.50.MEAN>DEF.50.MEAN+DEF.50.STDEV is evaluated. If the condition is true, then the payload ABC.50.MEAN, DEF.5MIN.VAL, DEF.1MIN.ALL, DEF.50.STDEV is output.

The process of converting a query string 114 to a persistent query 108 is called compilation. Two different compilation methods are dynamic compilation and runtime compilation. In dynamic compilation, a query parser 126 class takes the query string 114 as input and produces a Java program. (The query parser 126 class translates the query 114 into a standard form, ensures that the system can satisfy references to identifiers, and creates a fetcher class for each identifier.) Then a dynamic Java package uses the Java program to make a proxy class for the event condition evaluator. In runtime compilation, the java compiler javac and the disk are used to generate class bytes directly.

Processes

The following are step-by-step descriptions of some system processes 130 including details about how inter-process synchronization allows some processes to proceed concurrently. There are descriptions of processes to initialize the system 100 add a register 106 add a window 110 add a persistent query 108, and add a point.

A. Initialize the System

Figure 2:
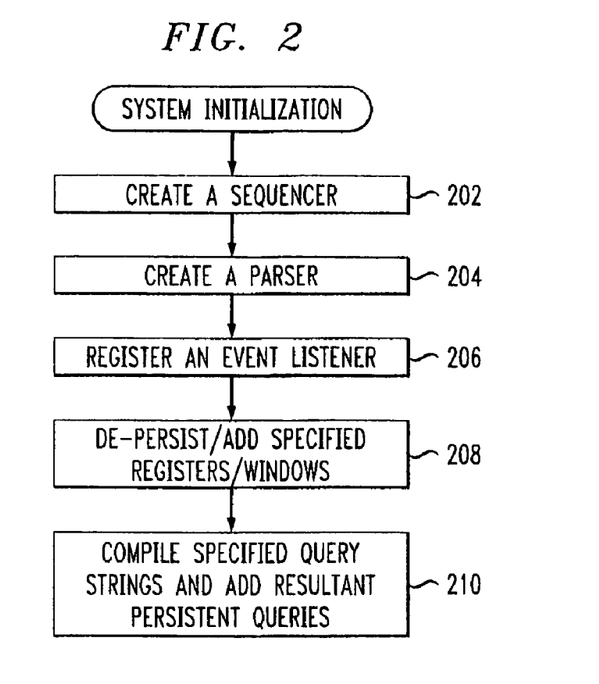
FIG. 2 is a diagram of a system initialization process of the system of FIG. 1.

The system 100 is initialized by creating a new engine instance or by loading a persisted engine instance from a file, using the following steps.

1. Create a sequencer. (The sequencer 104 provides a unique number for each input value. The sequence numbers are used to ensure that each result is detected exactly once.)

2. Create a parser. (The parser 126 plays a role in converting query strings 114 to persistent queries 108.)

3. Set a compilation directory. (The compilation directory is used as a container for class files during runtime compilation of persistent queries 108.)

4. Register an event listener with the system. (As part of the event detection and payload output functions, the event listener receives notifications when the system 100 detects true event conditions and receives output payloads 124).

When de-persisting an engine 100 from a file, initialization also contains these steps:

5. De-persist and add to the engine 100 any registers 106 and any windows 100 specified by the file.

6. Compile any query strings 114 specified by the file to form persistent queries 108. Add the persistent queries 108 to the engine 100. After this process, the engine 100 is ready to undertake other methods, including adding registers 116, windows 100, persistent queries 108, and data points. These other methods can be performed concurrently with each other after the engine 100 is instantiated.

B. Add a Register

Figure 3:
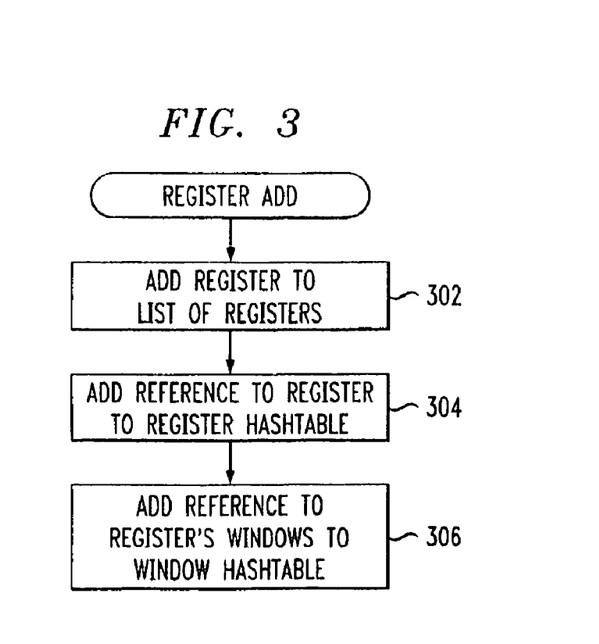
FIG. 3 is a diagram of a register add process of the system of FIG. 1.

The method to add a register 106 to the engine 100 comprises the following steps:

1. Add the register 106 to the list of engine registers.

2. Add a reference to the register 106 to a hashtable with register names as keys. This hashtable enables fast lookup of a register 106 by name.

3. If the register 106 contains any windows 110, add each window name, in the format REGISTER.WINDOW, to an engine hashtable with window names as keys. This hashtable enables fast lookup of a window 110 by register and window name.

C. Add a Window

Figure 4:
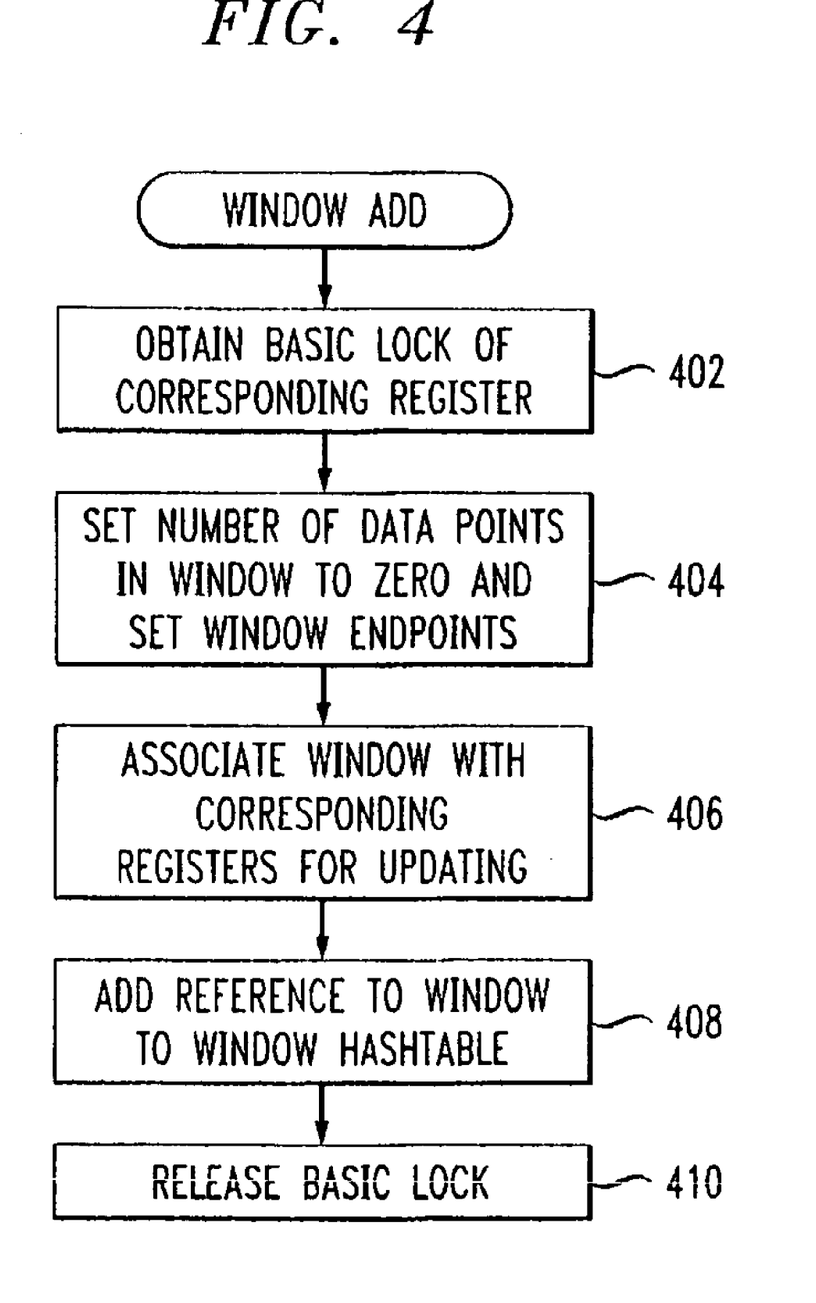
FIG. 4 is a diagram of a window add process of the system of FIG. 1.

The process to add a window 110 to a register 106 involves obtaining and releasing locks in order to ensure mutual exclusion between adding a window 110 and parts of other processes. For each register 106 there are two locks, a basic lock and a booster lock. Also, each window 110 has a lock. Obtaining a lock may involve waiting for the lock to be released by another process. Releasing a lock allows it to be obtained by another process. The process to add a window 110 to a register 106 comprises the following steps.

1. Obtain the basic register lock in order to ensure mutual exclusion with the process of adding a point to the register 106.

2. Set the number of points in the window 110 to zero, and set window endpoints to indicate that the most recent point in the register 106 is one position beyond the points in the window 110.

3. Associate the window 110 with the register 106 adding window 110 to the list of windows 110 to be updated for each input point received by the register 106.

4. Add the window name, in the format REGISTER.WINDOW, to an engine hashtable with window names as keys. This hashtable enables fast lookup of the window 110 by register and window name.

5. Release the basic register lock.

Figure 5:
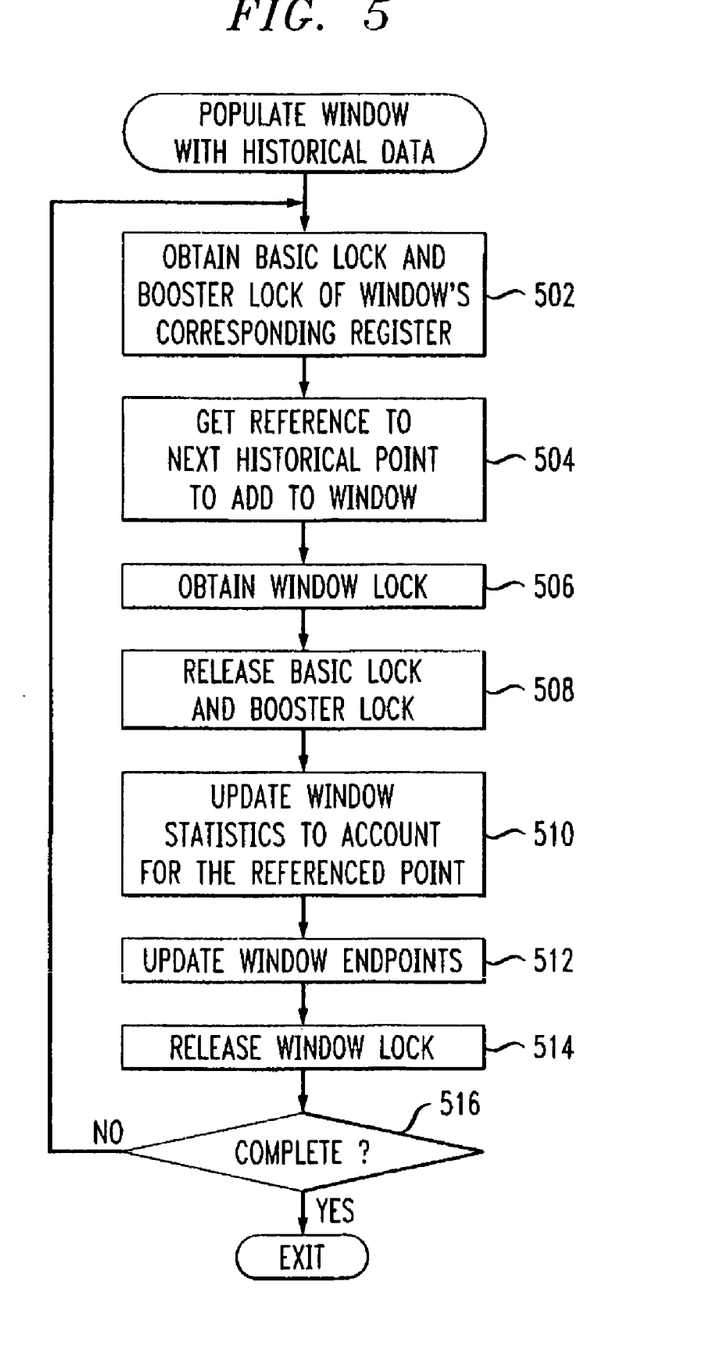
FIG. 5 is a diagram of a populate window with historical data process of the system of FIG. 1.

6. To use historical data to populate the window 110 use the following iterative process.

6a. Obtain the register booster lock. Obtain the register basic lock.

6b. Get a reference to the next historical point to add to the window 110 i.e., a reference to the most recent point in the register 106 that was added before the window 110 and is not in the window 110.

6c. Obtain the window lock.

6d. Release the register basic lock. Release the register booster lock.

6e. Update the window statistics to account for the referenced point.

6f. Update the window endpoints to indicate that the referenced point is in the window 110.

6g. Release the window lock.

6h. Determine whether the process of populating the window 110 is complete as follows. For a value window 110, check whether the next historical point to be added falls before the beginning of the time interval. If the process is not complete, then go to step 6a.

D. Add a Persistent Query

Figure 6:
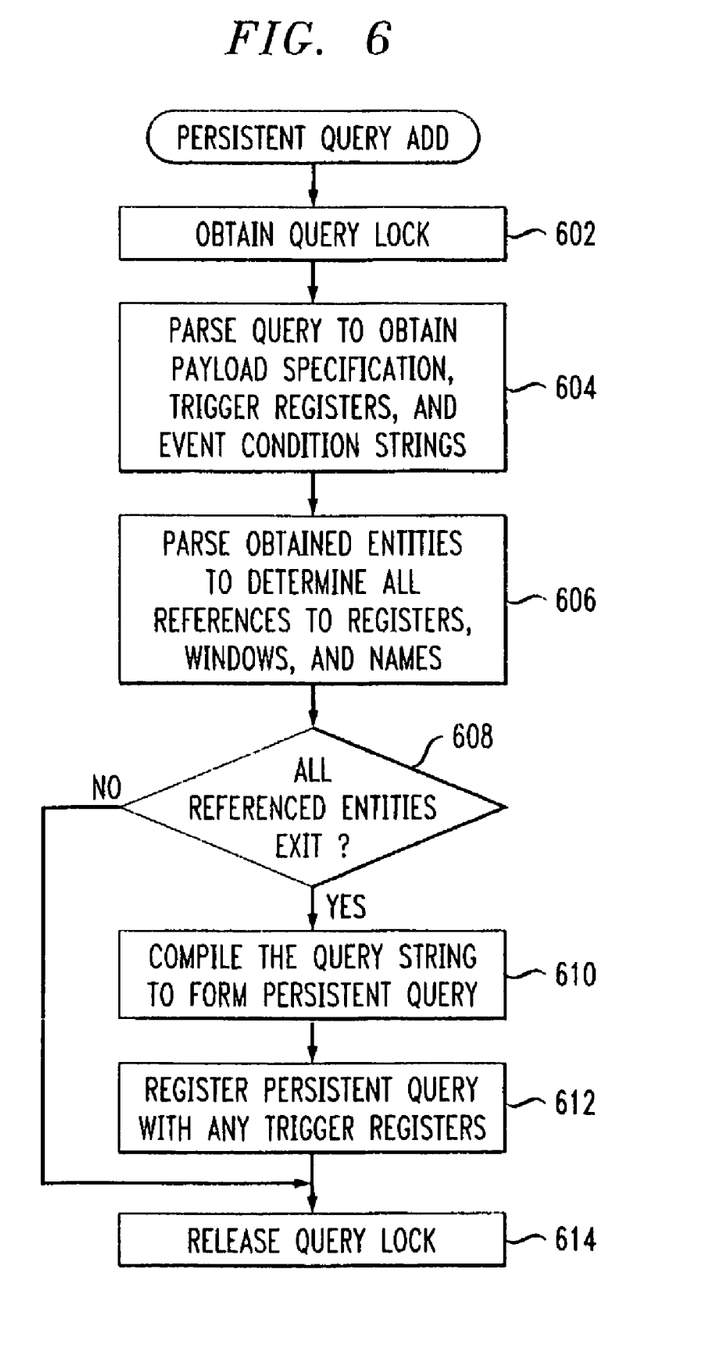
FIG. 6 is a diagram of a persistent query add process of the system of FIG. 1.

The engine 100 has a query lock, which is used to ensure mutual exclusion between the process of adding a persistent query 108 and the process of executing a persistent query 108. The process to add a persistent query 108, specified by a query string 114 to the engine 100 comprises the following steps.

1. Obtain the query lock.

2. Parse the query to obtain strings corresponding to the payload specification 122, trigger registers 106, and event condition 120.

3. Parse the payload specification, trigger registers, and event condition strings to determine all references to registers 106, windows 110, and names. Check that the referenced entities exist. If so, then proceed. If not, then release the query lock and exit this process.

4. Compile the query string 114 to form a persistent query 108 using runtime or dynamic compilation as described previously.

5. Register the persistent query 108 with any trigger registers 106 of the persistent query 108.

6. Release the query lock.

E. Add a Point

Figure 7:
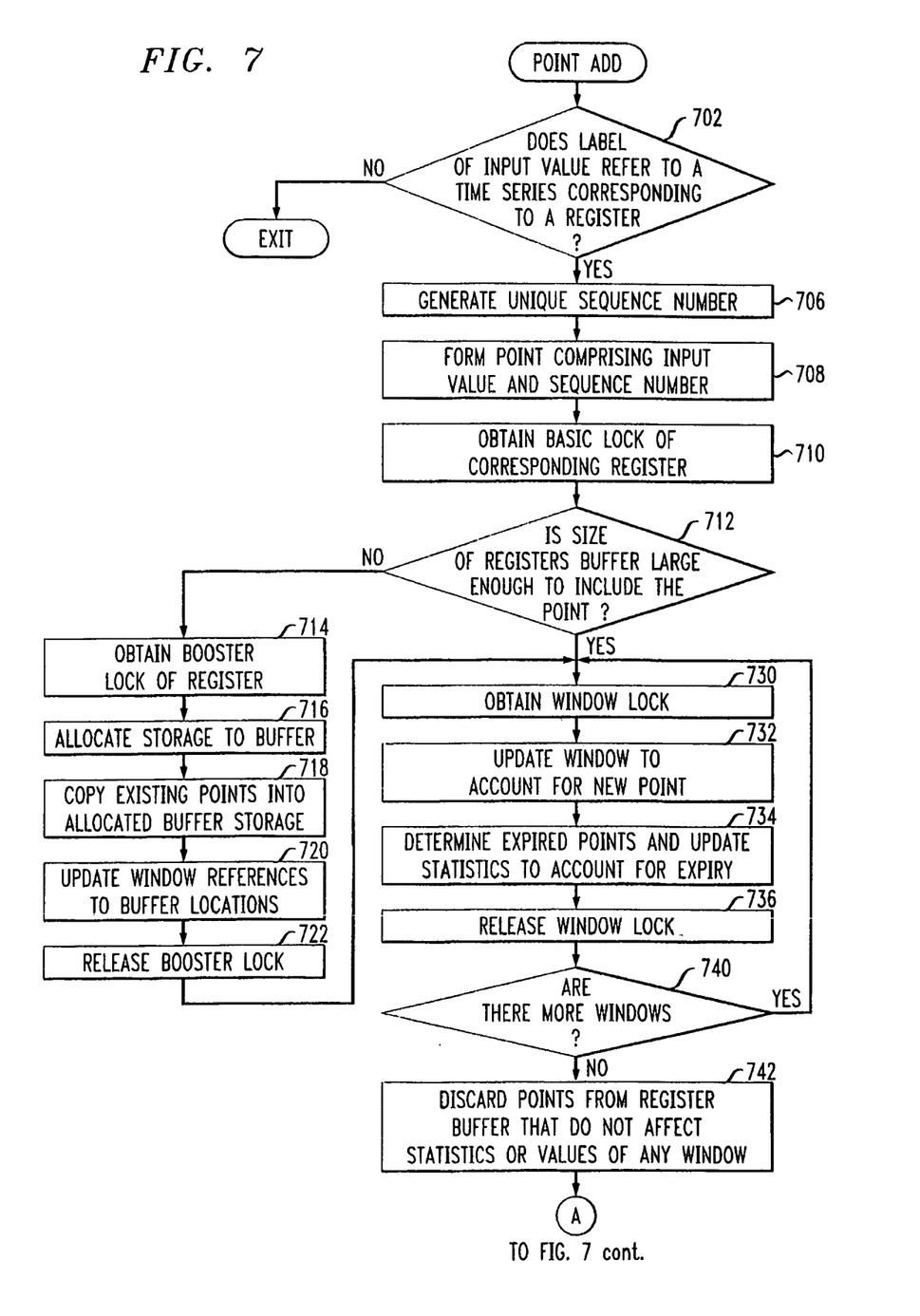
FIG. 7 is a diagram of a point add process of the system of FIG. 1.

Each input value 112 is accompanied by a label that indicates the time series to which the value belongs. The process by which the engine 100 handles an input time series value comprises the following steps.

1. Use the filter 102 to determine whether the label refers to a time series that corresponds to a register 106 in the engine 100. If not, then exit this process.

2. Use the sequencer 104 to generate a unique sequence number for the value. Form a point that comprises the value and the unique sequence number.

3. Obtain the register basic lock. This ensures that no window 110 is added to the register 106 and that no other point is added to the register 106 while the point is being added to the register 106.

4. Check whether the size of the buffer 116 in the register 106 is large enough to include the point in addition to any previous points in the buffer 116. If the buffer 116 is not large enough; then boost the buffer size as follows.

4a. Obtain the booster lock on the register 106. This ensures mutual exclusion with part of the process to populate a new window 110 with historical points.

4b. Allocate storage to increase buffer size.

4c. Copy existing points into any corresponding positions of newly allocated buffer storage.

4d. Update and window references to buffer locations.

4e. Release the register booster lock.

(A similar process to steps 4a to 4e is used to shrink the buffer size when little of the buffer 116 is being used after data expiry or window deletion.)

5. For each window 110 of the register 106, (a) obtain the window lock; (b) update the window 110 to account for the new point; (c) determine which points (if any) have expired from the window 110 and update statistics to account for expiry; (d) release the window lock.

6. Discard points from the register buffer that will have no further effect on statistics or values for any window 110.

7. For each persistent query 108 for which the register 106 is a trigger, do the following: Obtain the query lock. Evaluate the event condition 120. If the event condition 120 is true, then fetch and output the payload 124 as specified by the payload specification 122. Then release the query lock.

What is claimed is:

1. An apparatus for monitoring time series, comprising:
one or more registers each comprising a ring buffer for simultaneously storing a set of a plurality of received data points of a corresponding time series, wherein at least one register comprises one or more windows each corresponding to a subset of the set of received data points of the registers corresponding time series and wherein the subset chances with each received data point of the corresponding time series, each window for maintaining statistics for the corresponding subset and updating the statistics via online computation to account for data points of the corresponding time series moving into and out of the corresponding subset;
means for receiving data points of one or more time series and storing the received data points in the corresponding registers;
means for receiving query strings representing queries;
means for compiling the received query strings into persistent queries;
at least one said persistent query, each defining a query represented by received said query strings, each persistent query being a function of the time series of corresponding one or more trigger registers of the one or more registers, and wherein at least one persistent query defines an event condition and a payload specification of the defined query and at least one of the event condition and the payload specification of the at least one persistent query is a function of the statistics maintained by at least one window of at least one of the corresponding one or more trigger registers;

means, responsive to storing of a received data point in a trigger register, for evaluating each persistent query corresponding to the trigger register; and means for outputting a payload of each evaluated persistent query whose event condition has a first value.

2. The apparatus as recited in claim 1 further comprising:

means for dynamic management of the windows.

3. The apparatus as recited in claim 2 further comprising:

means for using historical values in present said windows to help populate inserted said windows.

4. The apparatus of claim 1 comprising:

means for dynamic management of persistent queries.

5. A computer-implemented method of monitoring time series, comprising:

receiving query strings representing a query;

compiling from the received strings a persistent query defining the represented query as a function of one or more time series;

receiving data points of the one or more time series;

storing the received data points each in a register comprising a ring buffer for simultaneously storing at set of a plurality of received data points of a corresponding one of the one or more time series, wherein at least one register comprises one or more windows each corresponding to a subset of the set of received data points of the register's corresponding time series and wherein the subset changes with each received data point of the corresponding time series;

maintaining statistics for any windows of the registers that store the received data points and updating the statistics via online computation to account for the data points of the corresponding time series moving into and out of the corresponding subsets;

in response to storing of a received data point in a register, using contents of the register to evaluate each persistent query that is a function of the register's corresponding time series, including using contents of the at least one window to evaluate one of an event condition and a payload specification of the persistent query that is a function of the at least one register's corresponding time series, where the at least one of the event condition and the payload specification is a function of the statistics for the at least one window of the at least one register; and outputting a payload of each evaluated persistent query whose event condition has a first value.

6. The method of claim 5 wherein updating statistics comprises:

performing online computation of the statistics.

7. The method of claim 5 further comprising:

dynamically managing the persistent queries.

8. The method of claim 5 further comprising:

dynamically managing the windows.

9. The method of claim 8 further comprising:

using historical values in present said windows to help populate inserted said windows.

* * * * *